United States Patent
Karatekeli et al.

(10) Patent No.: US 12,481,933 B2
(45) Date of Patent: Nov. 25, 2025

(54) IoT DRONE FLEET

(71) Applicant: DISH Technologies L.L.C., Englewood, CO (US)

(72) Inventors: Kayhan Karatekeli, Centennial, CO (US); Srinath Raghavan, Aurora, CO (US); Swapnil Tilaye, Broomfield, CO (US)

(73) Assignee: DISH TECHNOLOGIES L.L.C., Englewood, CO (US)

( * ) Notice: Subject to any disclaimer, the term of this patent is extended or adjusted under 35 U.S.C. 154(b) by 153 days.

(21) Appl. No.: 18/398,657

(22) Filed: Dec. 28, 2023

(65) Prior Publication Data

US 2024/0127133 A1    Apr. 18, 2024

Related U.S. Application Data

(63) Continuation of application No. 17/971,610, filed on Oct. 23, 2022, now Pat. No. 11,907,868, which is a (Continued)

(51) Int. Cl.
*G06Q 10/02* (2012.01)
*B64U 30/20* (2023.01)
(Continued)

(52) U.S. Cl.
CPC ............ *G06Q 10/02* (2013.01); *G05D 1/689* (2024.01); *G05D 1/692* (2024.01);
(Continued)

(58) Field of Classification Search
CPC .... G06Q 10/02; G06Q 30/0645; G05D 1/689; G05D 1/692; H04L 63/10; H04L 63/102;
(Continued)

(56) References Cited

U.S. PATENT DOCUMENTS

| | | |
|---|---|---|
| 6,690,997 B2 | 2/2004 | Rivalto |
| 8,511,606 B1 | 8/2013 | Lutke et al. |

(Continued)

FOREIGN PATENT DOCUMENTS

| | | |
|---|---|---|
| KR | 101780479 B1 | 10/2017 |
| WO | 2016154948 A1 | 10/2016 |

OTHER PUBLICATIONS

Azade Fotouhi, Ming Ding and Mahbub Hassan, "Service on Demand: Drone Base Stations Cruising in the Cellular Network", "https://arxiv.org/pdf/1710.09504.pdf", Oct. 26, 2017, p. 7.

(Continued)

*Primary Examiner* — Michael J Zanelli
(74) *Attorney, Agent, or Firm* — Wash Park IP Ltd.; John T. Kennedy

(57) ABSTRACT

Apparatus, systems, processes, and computer-readable mediums for facilitating the use of drones are described. For one embodiment, such a system includes a user element having a user application computer program configured to instruct a user interface device to facilitate use of user data and use of mission parameter(s) for a proposed drone mission. An owner element includes an owner application computer program configured to facilitate use of owner data and use of at least one drone parameter. A fleet system element is communicatively coupled to the user element and to the owner element and includes a computer system processor configured to facilitate use of a fleet record and use of at least one fleet parameter.

19 Claims, 2 Drawing Sheets

Related U.S. Application Data continuation of application No. 17/093,409, filed on Nov. 9, 2020, now Pat. No. 11,514,375, which is a continuation of application No. 15/964,303, filed on Apr. 27, 2018, now Pat. No. 10,860,953.

(51) Int. Cl.

| | | |
|---|---|---|
| *B64U 101/20* | (2023.01) | |
| *B64U 101/30* | (2023.01) | |
| *G05D 1/689* | (2024.01) | |
| *G05D 1/692* | (2024.01) | |
| *G06Q 30/0645* | (2023.01) | |
| *H04L 9/40* | (2022.01) | |
| *H04L 67/125* | (2022.01) | |

(52) U.S. Cl.
CPC ......... *G06Q 30/0645* (2013.01); *H04L 63/10* (2013.01); *H04L 67/125* (2013.01); *B64U 30/20* (2023.01); *B64U 2101/20* (2023.01); *B64U 2101/30* (2023.01)

(58) Field of Classification Search
CPC ... H04L 67/125; B64U 30/20; B64U 2101/20; B64U 2101/30; B64U 2201/00; H04W 12/08
See application file for complete search history.

(56) References Cited

U.S. PATENT DOCUMENTS

| | | | |
|---|---|---|---|
| 9,346,560 | B2 | 5/2016 | Wang |
| 9,384,668 | B2 | 7/2016 | Raptopoulos et al. |
| 9,387,928 | B1 | 7/2016 | Gentry et al. |
| 9,558,673 | B2 | 1/2017 | Soundararajan et al. |
| 9,589,448 | B1 | 3/2017 | Schneider et al. |
| 9,760,087 | B2 | 9/2017 | Hoareau et al. |
| 9,777,502 | B2 | 10/2017 | Curlander et al. |
| 9,849,979 | B2 | 12/2017 | Peeters et al. |
| 10,410,291 | B1 | 9/2019 | Binion et al. |
| 2014/0018976 | A1 | 1/2014 | Goossen et al. |
| 2015/0158599 | A1 | 6/2015 | Sisko |
| 2015/0266577 | A1 | 9/2015 | Jones et al. |
| 2016/0246297 | A1 | 8/2016 | Song |
| 2016/0357183 | A1 | 12/2016 | Shaw |
| 2016/0364989 | A1 | 12/2016 | Speasl et al. |
| 2017/0023939 | A1 | 1/2017 | Krouse et al. |
| 2017/0090484 | A1 | 3/2017 | Obaidi |
| 2017/0220979 | A1 | 8/2017 | Vaananen |
| 2017/0228692 | A1 | 8/2017 | Pargoe |
| 2017/0358212 | A1 | 12/2017 | Godwin et al. |
| 2018/0265194 | A1 | 9/2018 | Gauglitz |
| 2019/0035282 | A1 | 1/2019 | Ferguson et al. |
| 2019/0047695 | A1 | 2/2019 | Boudville |
| 2019/0369641 | A1 | 12/2019 | Gillett |
| 2022/0108244 | A1 | 4/2022 | Subramanian et al. |

OTHER PUBLICATIONS

Boeing, "Boeing 'Base Station' Concept would Autonomously Refuel Military Drones", "https://www.popsci.com/boeing-has-patented-drone-battle-station", Feb. 12, 2018, p. 3, Publisher: Boeing.

Iiker, A.; Regulating Commercial Drones: Bridging the Gap Between American and Europe Drone Regulations; 15 Journal of Intl. Business and Law; pp. 313-336 (2016) (Year: 2016).

Messous, Mohamed-Ayoub, et al. "Computation offloading game for an UAV network in mobile edge computing." 2017 IEEE International Conference on Communications (ICC). IEEE, 2017. (Year: 2017).

Pixiepath, "New Start-up Creating Drone Fleet Mgmt Platform", "https://unmanned-aerial.com/new-start-up-creating-drone-fleet-management-platform", Feb. 10, 2018, p. 1, Publisher: Pixiepath.

U.S. Appl. No. 17/064,123, Notice of Allowance, Nov. 16, 2023 (Available at USPTO Patent Center).

U.S. Appl. No. 17/064,123, Office Action Response, Oct. 25, 2023 (Available at USPTO Patent Center).

U.S. Appl. No. 17/064,123, Examiner Interview Summary, Nov. 16, 2023 (Available at USPTO Patent Center).

U.S. Appl. No. 17/064,123, Prosecution History through Sep. 15, 2023.

U.S. Appl. No. 17/064,123, Applicant Initiated Interview Summary, Oct. 17, 2023 (Available at USPTO Patent Center).

IoT DRONE FLEET

CROSS-REFERENCE TO RELATED APPLICATIONS

This application claims priority to and is a CONTINUATION of U.S. patent application Ser. No. 17/971,610, filed on 23 Oct. 2022, which is a Continuation of U.S. patent application Ser. No. 17/093,409, filed on 9 Nov. 2020, now U.S. Pat. No. 11,514,375, which is a continuation of U.S. patent application Ser. No. 15/964,303, filed on Apr. 27, 2018, now U.S. Pat. No. 10,860,953, each of the above identified applications being filed in the name of inventors Kayhan Karatekeli, Srinath Raghavan, and Swapnil Tilaye, and entitled "IOT Drone Fleet"; priority is claimed to each of the above identified applications and the entire contents of such applications are incorporated herein by reference.

TECHNICAL FIELD

The technology described herein generally relates to devices, systems, and methods for interconnecting and providing drones for use by non-drone owners. More specifically, the various embodiments disclosed generally relate to computer applications, databases, systems and methods directed to facilitating the provisioning, management, control, monitoring, and use by drones using one or more communications networks such as the Internet, satellite communications-based networks, cellular communications networks, and/or Internet-of-Things (IoT) connected devices, services, networks, and facilities.

BACKGROUND

Today, a need often arises for the use of drones in a wide-variety of personal, commercial, civilian, governmental, and other settings. Often the need to use a drone is for a limited or short-term purpose or period that does not warrant or justify the purchase of a drone by the intended user. Likewise, a drone is often not owned or available to the person or groups of persons needing use thereof, such person(s) hereafter, individually and collectively being identified as a drone "user." Contrarily, drones are often not actively used at any given time and are thus often an idle resource. Accordingly, a need exists for devices, systems and methods for providing use to drones by users and one which facilitates the sharing of unused drones. A need also exists for devices, system, and methods for controlling, monitoring, scheduling, and otherwise facilitating the use of drones. A need also exists for devices, systems, and methods for furthering compliance of drone uses with one or more regulatory, real-time or other constraints.

SUMMARY

The various embodiments of the present disclosure relate in general to devices, systems, and methods for use in facilitating the provisioning, management, control, monitoring, and use of drones using one or more communications networks such as the Internet, satellite communications-based networks, cellular communications networks, and/or Internet-of-Things (IoT) connected drones, devices, services, facilities, and persons.

In accordance with at least one embodiment of the present disclosure, a system for facilitating drone usage may include a user element. The user element may include a user application program including non-transient first computer executable instructions configured to instruct a user interface device to perform one or more computer-executed operations performed on behalf of, at the request of, and/or in support of a "user" (as further described herein), such computer implemented operations being identified herein as each a "user operation." The user operations may include a first user operation facilitating use of user data and a second user operation facilitating use of at least one mission parameter for a proposed mission.

For at least one embodiment, a system for facilitating drone usage may include an owner element. The owner element may include an owner application program including non-transient second computer executable instructions configured to instruct an owner interface device to perform one or more computer-executed operations performed on behalf of, at the request of, and/or in support of a drone "owner" (as further described herein), such computer implemented operations being identified herein as each an "owner operation." Owner operations may include a first owner operation facilitating use of owner data and a second owner operation facilitating use of at least one drone parameter.

For at least one embodiment, a system for facilitating drone usage may include a fleet system element. The fleet system element may be communicatively coupled to each of the user element and the owner element. The fleet system element may include a system processor configured to execute non-transient third computer executable instructions configured to perform one or more computer-executed operations performed on behalf of, at the request of, and/or in support of a drone system "operator" (as further described herein), such computer implemented operations being identified herein as each a "system operation." System operations may include a first system operation facilitating use of a fleet record and a second system operation facilitating use of at least one fleet parameter.

For at least one embodiment, a system for facilitating drone usage may include a third user operation facilitating use of at least one flight control. For at least one embodiment, a system for facilitating drone usage may include a fourth user operation facilitating use of at least one payload control. For at least one embodiment, a system for facilitating drone usage may include a third owner operation facilitating use of at least one drone control. For at least one embodiment, a system for facilitating drone usage may include a fourth owner operation facilitating use of at least one payload parameter. For at least one embodiment, a system for facilitating drone usage may include a fifth owner operation facilitating use of at least one flight control. For at least one embodiment, a system for facilitating drone usage may include a sixth owner operation facilitating use of at least one payload control. For at least one embodiment, a system for facilitating drone usage may include a third system operation facilitating use of at least one fleet control. For at least one embodiment, a system for facilitating drone usage may include a fourth system operation facilitating use of at least one fleet payload parameter. For at least one embodiment, a system for facilitating drone usage may include a fifth system operation facilitating use of one or more of the first owner operation, the second owner operation, the third owner operation, the fourth owner operation, the fifth owner operation, and the sixth owner operation.

For at least one embodiment, a system for facilitating drone usage may include computer executable instructions configured to instruct the user interface device to perform one or more user operations including: a fifth user operation for verifying whether a user element identified for the proposed mission is permitted to execute the proposed mission; and for a verified user element, communicating the proposed mission to the system element.

For at least one embodiment, a system for facilitating drone usage may include computer executable instructions configured to instruct a system processor to perform one or more system operations including: determining whether at least one drone is available for release to perform the proposed mission; determining whether release of at least one available drone is approved by the owner element associated with the at least one available drone; and releasing at least one of a user element, an owner element, and a system element to perform the proposed mission.

For at least one embodiment, a system for facilitating drone usage may include computer executable instructions configured to instruct a user interface device to perform one or more user operations including determining whether a revised mission parameter is available for a non-verified user element and, when a revised mission parameter is available, determining whether the revised mission parameter is acceptable to the user element. For at least one embodiment, a system for facilitating drone usage may include user operations for updating a proposed mission with the revised mission parameter; and communicating the proposed mission with the revised mission parameter to a system element.

For at least one embodiment, a system for facilitating drone usage may include use of at least one mission parameter including information provided by a user element, for a proposed mission, including at least one of an identifier, a date, a time, a location and an intended use.

For at least one embodiment, a system for facilitating drone usage may include use of at least one drone parameter providing information provided by the owner element, with respect to a given drone, and including at least one of a usage window, a home base identification, at least one acceptable use, and at least one operational constraint.

For at least one embodiment, a system for facilitating drone usage may include use of a fleet record including information provided by a fleet system element, with respect to a proposed mission, and including for at least one drone identified for use in the proposed mission, at least one of a reservation requirement, a rental term, insurance, certification requirements, and usage restrictions.

For at least one embodiment, a system for facilitating drone usage may include wherein the at least one fleet parameter includes information provided by a fleet system element, with respect to a proposed mission, including for at least one drone identified for use in the proposed mission, at least one of a usage window, a home base identification, at least one acceptable use, and at least one operational constraint.

For at least one embodiment, a system for facilitating drone usage may include a government system element, communicatively coupled to a fleet system element, and including non-transient first computer executable instructions configured to facilitate operations including at least one of drone control, air traffic control, permitting of at least one of users, owners, and operators, certifying drones, and emergency response.

In accordance with at least one embodiment of the present disclosure, a process for facilitating usage of a drone via a user interface device configured to execute a user application program is described. For at least one embodiment, a process for facilitating drone usage may include receiving a first input identifying at least one user record associated with a first user. For at least one embodiment, a process for facilitating drone usage may include receiving a second input including mission parameters for a proposed drone mission. For at least one embodiment, a process for facilitating drone usage may include, in response to the first input and the second input, first determining whether the proposed drone mission is acceptable, and when the first determining is positive, communicating the proposed drone mission to a fleet system element. For at least one embodiment, a process for facilitating drone usage may include operations, when the first determining is negative, of presenting at least one of a first option for revising at least one revised mission parameter, a second option for use of an alternative user for the proposed mission, a third option for the first user to qualify for the proposed mission and, based on a selection of one or more of the first option, the second option and the third option, revising the proposed mission. For at least one embodiment, a process for facilitating drone usage may include second determining whether the revised proposed mission is acceptable and, when the second determining is positive, communicating the revised proposed mission to the fleet system element.

For at least one embodiment, a process for facilitating drone usage may include use of a fleet system element configured to communicate at least one of the proposed drone mission and the revised proposed mission to at least one drone owner. For at least one embodiment, a process for facilitating drone usage may include, upon receiving approval from the at least one drone owner for at least one of the proposed drone mission and the revised proposed mission, enabling use, via the user interface device, of a least one flight control for an approved drone. For at least one embodiment, a process for facilitating drone usage may include use of at least one flight control configured based on at least one drone characteristic for the approved drone and based on at least one capability of the user interface device. For at least one embodiment, a process for facilitating drone usage may include use of at least one drone characteristic identified in at least one drone parameter record provided by a drone owner element for the approved drone. For at least one embodiment, a process for facilitating drone usage may include enabling use, via a user interface device, of at least one payload control for a payload of an approved drone. For at least one embodiment, a process for facilitating drone usage may include use of a payload that is at least one of a camera, a basket, and an interpretative guide.

BRIEF DESCRIPTION OF THE DRAWINGS

The features, aspects, advantages, functions, modules, and components of the devices, systems and methods provided by the various embodiments of the present disclosure are further disclosed herein regarding at least one of the following descriptions and accompanying drawing figures. In the appended figures, similar components or elements of the same type may have the same reference number and may include an additional alphabetic designator, such as 108a-108n, and the like, wherein the alphabetic designator indicates that the components bearing the same reference number, e.g., 108, share common properties and/or characteristics. Further, various views of a component may be distinguished by a first reference label followed by a dash and a second reference label, wherein the second reference label is used for purposes of this description to designate a view of the component. When only the first reference label is used in the specification, the description is applicable to any of the similar components and/or views having the same first reference number irrespective of any additional alphabetic designators or second reference labels, if any.

DETAILED DESCRIPTION

The various embodiments described herein are directed to devices, systems, and methods for use in facilitating the provisioning, management, control, monitoring, and use of drones using one or more communications networks such as the Internet, satellite communications-based networks, cellular communications networks, and/or Internet-of-Things (IoT) connected drones, devices, services, facilities, and persons.

As discussed above and as used herein, a "drone" is an unmanned aerial vehicle. Such drones may be operated automatically, semi-autonomously, autonomously, directly, indirectly, within or without line of sight of a pilot or other person in-command of the drone, or otherwise. A drone may include unmanned aerial vehicles regulated in accordance with the United States' Federal Aviation Administration Rule 107 or similar rules or regulations promulgated elsewhere and/or by other regulatory, governing or other bodies. But, for purposes of the present disclosure a "drone" is not limited to such vehicles. When operated by humans directly, visual line of sight may or may not be provided and/or required. A drone may come in any size, shape or configuration. For example, a drone may use one or more rotors to provide hover and/or vertical launch and/or landing capabilities. In other embodiments, a drone may utilize one or more propellers or other engine configurations to provide for moving launch and landing capabilities, such as those used by airplanes today.

A drone may be configured to utilize one or more communications mediums and/or protocols including, but not limited to, cellular, Bluetooth, 5G, WiFi, or otherwise. Drones may operate within various parameters including, but not limited to, hours of operations, range, elevation, ceiling, flight time, speed, rate of climb and/or descent, or otherwise. A drone may be configured to operate in one or more airspace classifications, such as one or more of those classifications specified by the U.S. Federal Aviation Administration or other local, regional, national, and/or international regulatory and/or governing bodies. A drone may be configured for practically any desired use, such as, photography, cinematography, mapping, delivery, search, recovery, rescue, surveillance, guidance, routing, firefighting, or otherwise.

Figure 1:
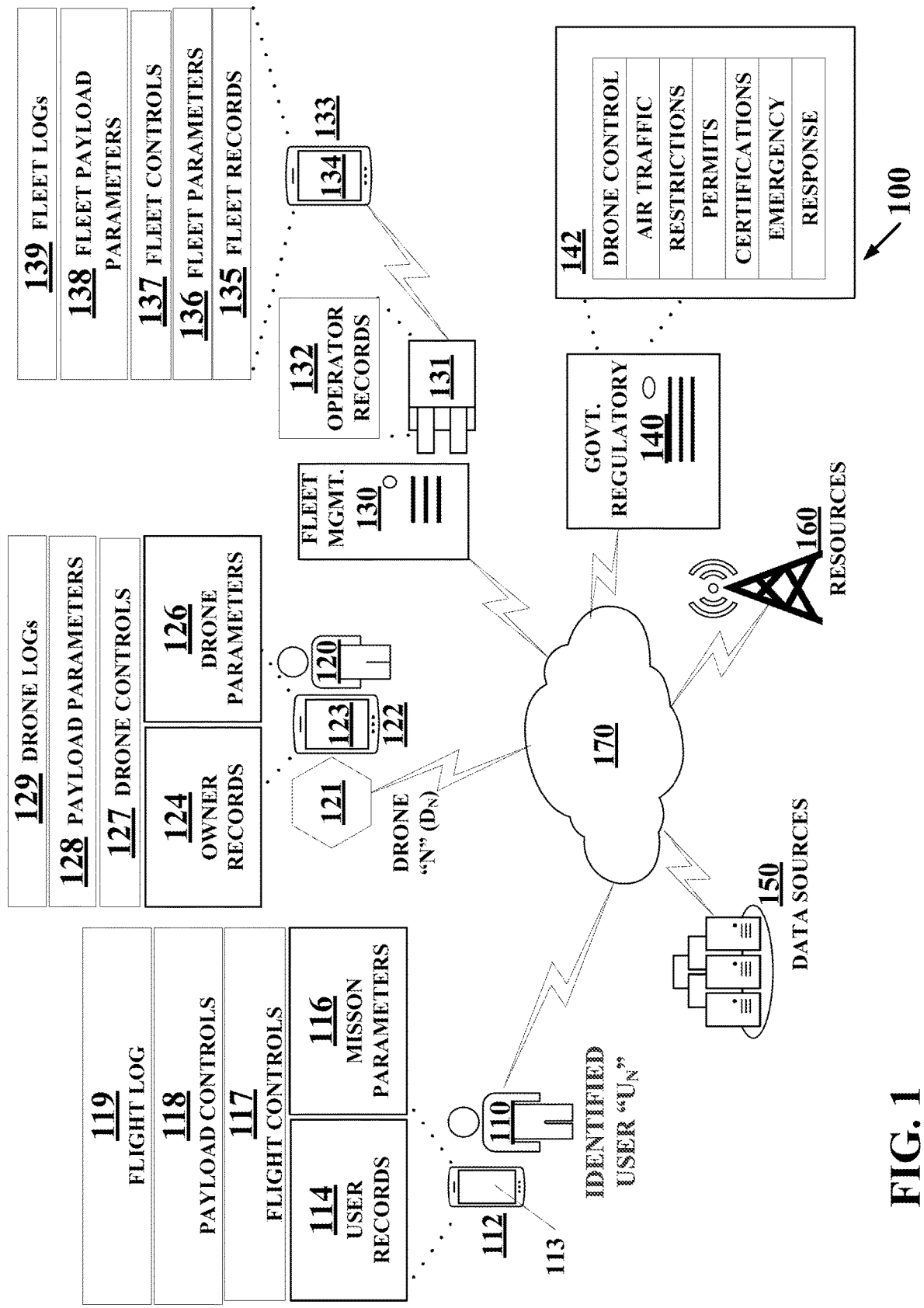
FIG. 1 is schematic representation of a system for facilitating, organizing, monitoring, controlling, regulating, and otherwise using drones by one or more users and in accordance with at least one embodiment of the present disclosure.

As shown in FIG. 1, a system 100 for facilitating the use of drone fleets includes elements utilized by three or more parties. Generally, the system 100 includes user elements 110 that virtually represent one or more interests, needs, desires, or otherwise of a first party, a "user." The user element 110 represents a present or known future arising a need, by a user, for use of a drone 121 for any lawful purpose. The user, as represented virtually by the user element 110 may be any legal entity, such as a person, a corporate entity, a governmental entity, a group of any of the foregoing, or otherwise. The lawful purpose may include any purpose that is permitted or may be permittable, presently or in the future. For example, use of a drone over a non-controlled airspace may be considered a presently permitted use, whereas use of a drone over a controlled airspace, where such use requires advance permission from a governmental, regulatory, private party, or other entity may be "permittable." It is to be appreciated that the permitted, permittable, and non-permitted uses may vary by drone, time, or otherwise. As discussed further herein, one or more embodiments of the present disclosure may be configured to enable a user 110 to pursue the acquiring of permits for permittable drone uses.

User Element

More specifically, the system 100 includes at least one user element 110. As discussed above, each user element 110 may be associated with and representative of a legal entity in the virtual domain. Such legal entities may include non-human entities, such as artificial intelligence and/or self-autonomous entities. The user element 110 may be instantiated on one or more servers, such as those provided by the fleet management system 130, on one or more user interface devices 112 or otherwise. As used herein, "instantiated" means that a set of data as used herewith, for example, to identify a legal entity as a "user" of the system 100, is populated into one or more data storage devices. Such data may be localized or distributed, as desired for any given embodiment and is accessible to facilitate use of the system by a user.

The user element 110 may be communicatively coupled to the system 100 by one or more user interface devices 112, such as a smart phone, table computing device, laptop device, in car information system, or other device capable of communicating with one or more devices or systems using one or more communications mediums. The user element may be instantiated in and/or provided separate from a given user interface device 112. For at least one embodiment, the user element 110 may be virtually represented and portable across two or more user interface devices 112. In other embodiments, the user interface element 110 may be bound, cryptographically or otherwise, to a given user interface device 112.

The user interface device 112 may be configured to include a user application 113 which facilitates use of the system 100 by a user. The user interface device 112 may be configured to access and/or work in combination with one or more secondary applications that are executable, directly or indirectly, remotely or locally, using a user interface device 112. Non-limiting examples of such secondary applications include communications applications, location identification applications, contact applications, weather applications, and others. The user application 113 may be configured to operate in conjunction with one or more of any presently available or future arising secondary applications.

The user application 113 and the user interface device 112 may be configured to perform computer executable instructions stored non-transiently on a computer data storage medium. The computer executable instructions are configured to perform a predefined set of basic operations in response to receiving a corresponding basic instruction. The data storage medium may be any medium presently available or arising in the future and may be located local and/or remote to the user interface device 112 and/or the user application 113. The computer executable instructions may be configured, when executed, to facilitate using, inputting, outputting, reviewing, providing, accessing, or otherwise (hereinafter, collectively "use/using") data relating to one or more drones 121, using the system 100. Examples of such data include one or more user records 114 providing information about one or more users. It is to be appreciated that a given user interface device 112 may include user records 114 about a single user, a group of users, or otherwise. Such user information may include contact information, such as name address, email address, phone number and others, demographic information, past flight information, future flight information, certifications including driver flight and other licenses, permits and designations, payment options, insurance information, restrictions, location information, and the like. It is to be appreciated that such user records 114 may include information that is cryptologically locked or otherwise secured, such as by use of a Blockchain, encryption technologies, or otherwise. For at least one embodiment, information useful in facilitating the use of one or more drones 121 by a user element 110 may be stored in a corresponding user record 114.

The user application 113 and the user interface device 112 may be configured to perform computer executable instructions stored non-transiently on a computer data storage medium which facilitate the provisioning of a drone 121 for current and/or future use by a given user element 110. Examples of such computer executable instructions include those providing one or more data entry fields by which a user may manually, semi-automatically or automatically input one or more mission parameters 116 related to an intended use of a drone 121. Non-limiting examples of such mission parameters 116 include a mission identifier, an intended date/time for the mission, a location for the mission, an intended use (e.g., aerial photography, tour guiding, emergency, communications linkage, transport, or otherwise), any operational constraints known to exist (e.g., height restrictions, use restrictions, or otherwise), and any other parameter relevant to the operational use of a drone 121 for a given mission. It is to be appreciated that the one or more mission parameters 116 may include one or more sub-parameters, such as an intended orbit path (if any), a flight area, a flight path, a transit path (e.g., from an intended flight area to/from a home location for a drone). Mission parameters 116 may be input by a user, via the user application 113, using any desired methodology and/or user interface technologies. For example, a flight path may be drawn on a map presented on a user interface device 112 using a stylus, one's finger, or otherwise. In other embodiments, the user element 110 may correspond to a virtual user (versus a human user) and such flight path may "drawn" using computer executable software codes communicated by the virtual user, as represented by the user element 110, to the user application 113 and/or to any additional or other applications configured for use in producing desired flight paths, or other mission parameters. For at least one embodiment, mission parameters may include options for leasing a drone in a first city, while actual use of the drone arises with regards to a second or different city.

The computer executable instructions may be configured to adjust, include, add, delete, prevent, or otherwise function with respect to one or more mission parameters. For example, the intended use of a flight path or flight area proceeding through and/or arising in a restricted airspace may be precluded by the user application 113 or another application and may be limited or precluded until any needed authorization(s) are obtained. Likewise, a flight path drawn in whole or in part within a restricted airspace may be adjusted by the computer executable instructions to preclude flight within such restricted airspaces. It is to be appreciated that the user application 113 may utilize information provided by third parties, such as govt systems 140 and/or other data sources 150 in assisting a user element 110 with specifying one or more mission parameters 116.

The user application 113 may be configured, alone or in conjunction with other applications, to provide one or more flight controls 117. Such flight controls 117 may be configured based on one or more drone characteristics 124 for a given drone 121 provisioned for a given mission. The flight controls 117 may be configured based on one or more conditions such as the capabilities of the user interface device 112 and/or any accessory devices communicatively coupled thereto for use in operating a drone 121 during a given mission. It is to be appreciated that non-limiting examples of such accessory devices include controllers, heads-up displays, communications capabilities by and between a drone and the given user interface device 112 for a given mission, and otherwise. It is to be appreciated that a given user, as expressed in one or more user records 114, and a represented virtually as a user element 110, may not possess the necessary certifications, experience or otherwise required for a given use of a given drone for a given mission. Accordingly, the user interface device 112 and the user application 113 may be configured to preclude and/or permit the providing of one or more flight controls 117 to a given user. That is, a set of such flight controls 117 provided to a first user may vary from those provided to a second user. Likewise, a set of flight controls 117 provided for a first mission may vary from those provided for a second mission. Such providing of flight controls 117 may arise in view of then arising governmental, environmental or other concerns, the user records 114, and otherwise. It is to be appreciated, that in at least one or more embodiments, flight controls 117 may be facilitated using artificial intelligence, automated flight control, remote flight control of a given drone by a person other than the user 110, such as a drone owner 120, or other interface and/or control system built into and/or remotely operable by another person or system.

The user application 113 may be configured, alone or in conjunction with other applications, to provide one or more payload controls 118. Payload controls 118 may be provided separate and/or integrated with one or more flight controls 117. As used herein, a "payload" refers to the non-flight characteristics of a drone 121. Non-limiting examples of payloads include cameras, mapping software, lifting/carrying mechanisms, user interfaces, and otherwise. Payload controls 118 may be configured based on one or more characteristics of the payload being used with a given drone 121 for a given mission and in view of one or more mission parameters 116. It is to be appreciated that controls (e.g., flight 117 and/or payload 118) may be configured, for at least one embodiment, in view of a given user's characteristics, as expressed by the user records 114 and/or a user interface element 110.

Further, payload controls 118 may be configured based on one or more conditions such as the capabilities of the user interface device 112 and/or any accessory devices communicatively coupled thereto for use in operating a given drone during a given mission, using a given payload. It is to be appreciated that non-limiting examples of such accessory devices include controllers, heads-up displays, communications capabilities by and between a drone and the given user thereof for a given mission, and otherwise. For example, a drone outfitted for aerial photography may be communicatively coupled to a user interface device 112 to facilitate control by a user of a camera's various features and functions, such as, its aperture, focal length, ISO setting, orientation (independent of the orientation of the drone itself), or otherwise.

The user application 113 may be configured, alone or in conjunction with other applications, to provide one or more flight log 119 capabilities. The flight log 119 may include the recording of any desired information related to a given mission. Non-limiting examples of such flight log information includes location, altitude, time on station, mission status (e.g., success or failure), or otherwise. It is to be appreciated, that any and/or all information and/or applications utilized by a user interface device 112, user application 113, or otherwise to facilitate the use of a drone 121 for one or more missions, per one or more embodiments of the present disclosure, may be also provided to one or more of the drone owner 120, the fleet management system 130, govt systems 140, or otherwise. Such information may be provided in any format including, but not limited to, anonymized, encrypted, clear text, or otherwise.

Drone Owner Element

As further shown in FIG. 1, the system 100 may generally include elements utilized by one or more second parties, each being a "drone owner" 120, who has the right to control the use of one or more drones 121. The drone owner 120 may be any legal entity having ownership and/or use rights (hereafter, "drone rights") 124 with regards to one or more drones 121. Such drone rights may vary by drone owner, the drone itself, territory, time, day, or otherwise.

For at least one embodiment, the system 100 may include elements, such as drones, databases, and other elements described below, utilized by one or more drone owners. Such drones are commonly owned by one or more drone owners, who may be any entity, private, public, for profit, non-profit, governmental, non-governmental or otherwise. In accordance with at least one embodiment, a drone owner may include a private person who owns a drone possessing certain capabilities—such drone owner being willing to let others use a drone in exchange for financial or other considerations. Like rentals by private owners of real properties, a drone owner may subscribe to and/or make one or more drones 121 available for rental by others. Such rentals may be facilitated by a fleet management system 130, as further described below. Drone owners may be virtually represented in the system by a drone owner element 120. Drone owners may utilize an owner interface device 122 configured to execute an owner application 123 which enables a drone owner to access various features and functions of the system.

The drone owner element 120 may be instantiated on one or more servers, such as those provided by the fleet management system 130, on one or more owner interface devices 122, or otherwise. As used herein, "instantiated" means that a set of data as used herewith, for example, to identify a legal entity as an "owner" of one or more drones for use with the system 100, is populated into one or more data storage devices. Such data may be localized or distributed, as desired for any given embodiment and is accessible to facilitate use of the system by an owner.

The owner element 120 may be communicatively coupled to the system 100 by one or more owner interface devices 122, such as a smart phone, table computing device, laptop device, in car information system, or other device capable of communicating with one or more devices or systems using one or more communications mediums. The owner interface device 122 may be configured to include an owner application 123 which facilitates use of the system 100 by the drone owner. The owner interface device 122 may be configured to access and/or work in combination with one or more secondary applications that are executable, directly or indirectly, remotely or locally, by the owner's interface device 122. Non-limiting examples of such secondary applications include communications applications, location identification applications, contact applications, weather applications, and others. The owner application 123 may be configured to operate in conjunction with any desired secondary applications. The owner application 123 and the user application 113 may be provided by a single, multi-purpose application capable of operating in either a user and/or a drone owner mode, as may arise from time to time for one or more drone missions.

The owner application 123 and the owner interface device 122 may be configured to perform computer executable instructions stored non-transiently on a computer data storage medium. The computer executable instructions are configured to perform a predefined set of basic operations in response to receiving a corresponding basic instruction. The data storage medium may be any medium presently available or arising in the future and may be located local and/or remote to the owner interface device 122 and/or the owner application 123. The computer executable instructions may be configured, when executed, to facilitate the use of data relating to the use of one or more drones 121 using the system 100. Examples of such data include one or more owner records 124 providing information about one or more owners, as such owners are represented virtually by one or more drone owner elements 120. It is to be appreciated that a given user interface device 122 may include owner records 124 about a single owner, a group of owners, or otherwise. Such owner records 124 may include any form, type, or quantity or otherwise of information, such as, information provided by and/or in user records 114 (as described above), demographic information, past flight information, future flight information, certifications, payment options, insurance information, restrictions, information regarding one or more drones, such as serial numbers, registrations, damages, mechanical or other information relating to the airworthiness or otherwise of one or more drones, and the like. It is to be appreciated that such owner records 124 may include information that is cryptologically locked or otherwise secured, such as by use of a Blockchain, encryption technologies, or otherwise. For at least one embodiment, information useful in facilitating the use of one or more drones 121 by a user may be stored in a corresponding owner record 124.

The owner application 123 and the owner interface device 122 may be configured to perform computer executable instructions stored non-transiently on a computer data storage medium which facilitate the provisioning of a drone 121 for current and/or future use by a given user, as represented by a user element 110. Examples of such computer executable instructions include those providing one or more data entry fields by which a drone owner may manually, semi-automatically or automatically input one or more drone parameters 126 related to an intended use of one or more given drones 121. Non-limiting examples of such drone parameters 126 include drone usage windows, such as dates/times a given drone is available for a mission, a location or home base for the drone (which may vary over time), acceptable uses for the drone (e.g., aerial photography, tour guiding, emergency, communications linkage, transport, or otherwise), any operational constraints such as range, ceiling, speed, or otherwise, and any other parameter affecting the use of a drone 121 that may exist, and any other parameter relevant to the operational use of a given drone 121 for any given actual or potential mission. It is to be appreciated that the one or more drone parameters 126 may include one or more sub-parameters, such as permitted flight areas, permitted flight distance, transit restrictions (e.g., acceptable routes from an intended flight area to/from a home location for a drone), or otherwise.

For at least one embodiment, drone parameters 126 may be specified by a drone manufacturer and fixed for a given drone. For at least one embodiment, drone parameters may be specified and/or modified by a drone owner, a fleet management system 130, a govt system 140, or otherwise. Drone parameters 126 may also be specified by a drone owner or other entity from time to time and for any given mission or set of missions, including but not limited to all missions, using any desired methodology and/or user interfaces. The computer executable instructions may be configured to adjust, include, add, delete, prevent, or otherwise function with respect to one or more drone parameters 126.

Drone parameters 126 may be determined in view of a given requested mission parameters 116. For example, the intended use of a flight path or flight area proceeding through and/or arising in a restricted airspace may be precluded by the owner application 123 and/or may be limited until any needed authorization(s) are obtained, if obtainable, from the fleet management system 130, a govt system 140, or otherwise. Likewise, a flight path drawn or requested by a user that requires a transit in and/or through, in whole or in part, an airspace restricted by a drone owner, a govt system 140 or otherwise, may be adjusted by the computer executable instructions of the owner application 123 to preclude use of the drone other than within then acceptable drone parameters 126. It is to be appreciated that the drone application 123 may utilize information provided by third parties, such as fleet management systems 130, govt systems 140, and/or other data sources 150, and information provided by and/or about a requesting user of a given drone to adjust, modify, specify or otherwise set one or more drone parameters 126.

Information about a user, as expressed in one or more user records 114, may also be communicated by a user application 113 to a drone application 123 and used in specifying one or more drone parameters 126. In accordance with at least one embodiment, a drone owner may specify one or more user parameters, as a drone parameter, before use of one or more drones 121 by a given user, as represented by a user element 110, is permitted. Such user parameters may include user required certifications, experience, and/or any other parameter. Drone parameters 126 may be specific to a given mission, universal for all missions for that given one or more drones, or otherwise. Drone parameters 126 may vary based on then arising conditions, such as unexpected or then arising weather conditions, other higher priority use needs, or otherwise.

The owner application 123 may also be configured, alone or in conjunction with other applications and/or the fleet management system 130, to provide one or more drone controls 127. Such drone controls 127 may be configured based on one or more drone parameters 126 for a given drone 121 provisioned for a given mission. Drone controls 127 may include a same or different set of control elements as may be specified by one or more flight controls 117. Drone controls 127 may include additional controls for a given drone beyond those provided by one or more flight controls 117. Drone controls 127 may be configured to take priority over one or more flight controls 117. That is, drone control 127 may be configured to communicate flight control signals to one or more drones that take precedence over flight control signals otherwise sent by a user interface device 112 to a given drone. For example, the owner application 123 and/or the fleet management system 130 may be configured such that a drone control signal of "return to base" takes precedence over other flight control signals.

The drone controls 127 may be configured based on one or more conditions such as the capabilities of the owner interface device 122 and/or any accessory devices communicatively coupled thereto for use in operating a drone 121, during a given mission. It is to be appreciated that non-limiting examples of such accessory devices include controllers, heads-up displays, communications capabilities by and between a drone and the given owner interface device 122 for a given mission, a given drone and otherwise. It is to be appreciated that a given owner, as represented virtually by a corresponding drone owner element 120, may be further defined by one or more owner records 124. Such owner records 124, for example, may identify whether an owner does or does not possess the necessary certifications, experience or otherwise required for a given use of a given drone for a given mission. For at least one embodiment, a use of a drone may be limited by the certifications, experience and/or use rights possessed by a given owner thereof and/or by an intended user for a given drone, for a given mission.

More specifically, for at least one embodiment, the use of a drone may be limited by the certifications, experience and/or use rights possessed by a given user, as represented virtually by a user element 110 and/or one or more user records 114, for a given mission. It is to be appreciated that a drone owner may have more or less certifications, experience and/or use rights than a user for a given mission. The system 100 may be configured to accommodate such differences in facilitating drone missions, mission parameters 116 and drone parameters 126. Accordingly, the user interface device 112 and the user application 113 and/or the owner interface device 122 and the owner application 123 may be configured to preclude and/or permit the providing of one or more flight controls 117 and/or drone controls 127 to a given user element 110 or owner element 120, respectively, for a given mission. That is, a set of such flight controls 117 and/or owner controls 127 provided may vary by user, owner, mission or otherwise.

Likewise, a set of flight controls 117 and/or drone controls 127 provided for a first mission may vary from those provided for a second mission. Such providing of flight controls 117 and/or drone controls 127 may arise in view of then arising governmental, environmental, or other concerns, the user records 114, owner records 124, and otherwise. It is to be appreciated, that in at least one or more embodiments, flight controls and/or drone controls 127 may be facilitated using artificial intelligence, automated flight control, remote flight control of a given drone by a person other than the user or a drone owner, such as by a drone control system operated by a fleet management system 130, a govt system 140, or otherwise.

The owner application 123 may be configured, alone or in conjunction with other applications, to provide one or more payload parameters 128. Payload parameters 128 may be provided separate and/or integrated with one or more drone controls 127, flight controls 117 and/or payload controls 118. Payload parameters 128 may include payload control elements and may be configured based on one or more characteristics of those one or more payloads acceptable for use with and/or being used with a given drone 121 for a given mission and in view of one or more mission parameters 116 and/or drone parameters 126.

Payload parameters 128 may be configured based on one or more conditions such as the capabilities of a user interface device 112, and/or an owner interface device 122, and/or any accessory devices to be used and communicatively coupled to either of the interface devices, for use with a given drone, during a given mission. It is to be appreciated that non-limiting examples of such accessory devices include controllers, heads-up displays, communications capabilities by and between a drone and the given user thereof for a given mission, and otherwise. For example, a drone outfitted for aerial photography may need to be communicatively coupled to a user interface device 112 and/or owner interface device 122 configured to facilitate control by a user and/or owner, as the case may be, of a camera's various features and functions, such as, its aperture, focal length, ISO setting, orientation (independent of the orientation of the drone itself), or otherwise. Payload parameters 128 may preclude use of a drone 121 when a given user interface device 112 and/or owner interface device 122 is otherwise incompatible or not configured for use with a given payload, for a given mission.

The owner application 123 may also be configured, alone or in conjunction with other applications, to provide one or more drone logs 129. The drone log 129 may include the recording of any desired information related to uses of a drone for one or more missions. Non-limiting examples of such drone log 129 information includes location, altitude, time on station, mission status (e.g., success or failure), total flight time, maintenance records, payloads, or otherwise. It is to be appreciated, that any and/or all information and/or applications utilized by an owner interface device 122, owner application 123, or otherwise to facilitate the use of a drone 121 for one or more missions, per one or more embodiments of the present disclosure, may be also provided to one or more of the drone owner element 120, the fleet management system 130, govt systems 140, or otherwise in a drone log 129. The drone log 129 may include any and/or all information recorded in a flight log 119 for a given drone. Such information may be provided in any format including, but not limited to, anonymized, encrypted, clear text, or otherwise.

Fleet Management System Element

As shown in FIG. 1, the system 100 may include elements utilized by a fleet management system 130, which may be accessed, for example, using one or more web servers or similar system configurations. The fleet management system 130 may be owned and/or operated by the first party, the second party, or by a third-party, as desired for any given embodiment of the present disclosure. Generally, the fleet management system 130 elements facilitate the provisioning, scheduling, accounting, management, monitoring, and other aspects of drones owned by a second party 120 and used by a first party 110.

For at least one embodiment, the system 100 may include a fleet management system element 130 utilized to facilitate the provisioning, scheduling, accounting, management, monitoring, and other aspects of drones owned by a drone owner and used by a user. The fleet management system element 130 (the "system element"), may be instantiated on one or more servers. Data used by such system element 130 may be stored locally or distributed across one or more data storage devices, as desired for any given embodiment, and is accessible to facilitate use of the system by a system operator element 131 (an "operator element").

The operator element 131 is a virtual instantiation of an operator of the system element 100. An operator may be a person, an automated process, a semi-automated process, an artificial intelligence entity, a combination of any of the foregoing, or otherwise. The operator element 131 may be associated with any legal entity, such as private, public, for profit, non-profit, governmental, non-governmental, or other body.

In accordance with at least one embodiment, an operator element 131 may be associated with an operator (human or otherwise) that is identified by one or more operator records 132. Operator records 132 may vary by operator and specify characteristics of an operator, permissions, restrictions, and other parameters related to the use of the system by such operator. Operator records 132 may be tied to one or more operator logs (not shown) which track and/or otherwise identify actions taken by a given operator during use of the system. Operator elements 131, and permissions and rights granted thereto by the fleet management system 130, may vary by operator and/or any other consideration or constraint.

The system element 130 may include one or more operator interface devices 133, communicatively coupled to an operator element 131, which facilitate use of the system element 130 by an operator. Non-limiting examples of operator interface devices 133 include computer desktops, smart phones, table computing devices, laptop devices, in car information system, or any other device or combinations thereof capable of communicating with one or more devices or systems using one or more communications mediums. The operator interface device 133 may be configured to include an operator application 134 which facilitates use of the system 100 by an operator, as represented by an operator element 131. The operator interface device 133 may be configured to access and/or work in combination with one or more secondary applications that are executable, directly or indirectly, remotely or locally, by the operator's interface device 133. Non-limiting examples of such secondary applications include communications applications, database applications, and others. The operator application 134 may be configured to operate in conjunction with any desired secondary applications. The operator application 134 may include one or more, if not all, of the features and/or functions of the user application 113 and/or the owner application 123.

The operator application 134 and the operator interface device 133 may be configured to perform computer executable instructions stored non-transiently on a computer data storage medium. The computer executable instructions are configured to perform a predefined set of basic operations in response to receiving a corresponding basic instruction. The data storage medium may be any medium presently available or arising in the future and may be located local and/or remote to the operator interface device 133 and/or the operator application 134. The computer executable instructions may be configured, when executed, to facilitate the use of data relating to the use of one or more drones 121 using the system 100.

Examples of such data include one or more fleet records 135 providing information about one or more owners, as such owners are represented virtually by one or more drone owner elements 120, the drones provided by such owners, the use of such drones, and other information relating to the use of drone pursuant to the present disclosure.

It is to be appreciated that a given fleet record 135 may include data about a single drone owner, a group of drone owners, users, or otherwise. A fleet record 135 may include data arising from one or more user records 114, owner records 124, or otherwise. Such fleet records 135 may include any form, type, or quantity or otherwise of information about drones, owners, users, and/or combinations thereof, including but not limited to information provided in one or more user records 114, owner records 124 and otherwise, as well as information pertaining to the fleet management system and/or its operators, owners, investors or otherwise, such information may include contact information, demographic information, past flight information, future flight information, certifications, payment options, rental terms including costs and charges for drones (such charges may be accrued based on any time increment, subscription agreement, or otherwise), reservation requirements, insurance information, restrictions, assets, such as types of drones, capabilities thereof, and the like. It is to be appreciated that such fleet records 135 may include information that is cryptologically locked or otherwise secured, such as by use of a Blockchain, encryption technologies, or otherwise. For at least one embodiment, information useful in facilitating the use of one or more drones 121 by a user may be stored in a corresponding fleet record 135.

The operator application 134 and the operator interface device 133 may be configured to perform computer executable instructions stored non-transiently on a computer data storage medium which facilitate the provisioning of a drone 121 for current and/or future use by a given user, as represented by a user element 110. Examples of such computer executable instructions include those providing one or more data entry fields by which an operator may manually, semi-automatically or automatically input one or more fleet parameters 136 related to an intended use of one or more given drones 121 in a fleet of drones managed by the system element 130. Non-limiting examples of such fleet parameters 136 include drone usage windows, such as dates/times drones are available for a mission, a location or home base for the drones (which may vary over time), acceptable uses for the drones (e.g., aerial photography, tour guiding, emergency, communications linkage, transport, or otherwise), any operational constraints such as range, ceiling, speed, or otherwise, and any other parameter affecting the use of a drone 121 that may exist, and any other parameter relevant to the operational use of a given drone 121 for any given actual or potential mission. It is to be appreciated that the one or more fleet parameters 136 may include one or more sub-parameters, such as individual drone parameters 126, permitted flight areas, permitted flight distance, transit restrictions (e.g., acceptable routes from an intended flight area to/from a home location for a drone), or otherwise.

For at least one embodiment, fleet parameters 136 may be specified by a drone manufacturer and fixed for a given drone. For at least one embodiment, fleet parameters 136, as relating to a given drone, may be specified and/or modified by a drone owner, a govt system element 140, or otherwise. Fleet parameters 136 may also be specified by an operator or other entity from time to time and for any given mission or set of missions, including but not limited to all missions, using any desired methodology and/or user interfaces. The computer executable instructions may be configured to adjust, include, add, delete, prevent, or otherwise function with respect to one or more fleet parameters 136.

Fleet parameters 136 may be determined in view of a given set of requested mission parameters 116. For example, the intended use of a flight path or flight area proceeding through and/or arising in a restricted airspace may be precluded by the operator application 134 and/or may be limited until any needed authorization(s) are obtained, if obtainable, from another operator (e.g., a supervisory operator having a higher level of permission or authority) the fleet management system 130, a govt system 140, or otherwise. It is to be appreciated that the operator application 134 may utilize information provided by third parties, such as drone owner elements 120, govt systems 140, and/or other data sources 150, and information provided by and/or about a requesting user of a given drone to adjust, modify, specify or otherwise set one or more fleet parameters 126.

Information about a user, as expressed in one or more user records 114, may also be communicated by a user application 113 to the operator application 134 and used in specifying one or more fleet parameters 126, which may include one or more drone parameters 126. In accordance with at least one embodiment, a system operator may specify one or more user parameters, drone owner parameter, drone parameters, and/or fleet parameters that must be satisfied before use of one or more drones 121 by a given user, as represented by a user element 110, is permitted. Such parameters may include user required certifications, experience, owner compliance with maintenance requirements, and/or any other parameter. Fleet parameters 136 may be specific to a given mission, universal for all missions for that given one or more drones, or otherwise. Fleet parameters 136 may vary based on then arising conditions, such as unexpected or then arising weather conditions, other higher priority use needs, or otherwise.

The operator application 134 may also be configured, alone or in conjunction with other applications and/or the system element 130, to provide one or more fleet controls 137. Such fleet controls 137 may be configured based on one or more fleet parameters 136 for a given drone 121, or set thereof, as provisioned for a given mission or set of missions. Fleet controls 137 may include a same or separate set of control elements as may be specified by one or more flight controls 117 and/or drone controls 127. Fleet controls 137 may include additional controls for a given drone, or set thereof, beyond those provided by one or more flight controls 117 and/or drone controls 127. Fleet controls 137 may be configured to take priority over one or more flight controls 117 and/or drone controls 127. That is, a fleet control 137 may be configured to communicate flight control signals to one or more drones that take precedence over flight control signals otherwise sent by a user interface device 112 or an owner interface device 122 to a given drone or set of drones. For example, the operator application 134 and/or the system element 130 may be configured such that a drone control signal of "return to base" takes precedence over other flight control signals.

The operator application 134 may be configured, alone or in conjunction with other applications, to provide one or more fleet payload parameters 138. Fleet payload parameters 138 may be provided separate and/or integrated with one or more fleet controls 137, payload parameters 128, flight controls 117, and/or payload controls 118. Fleet payload parameters 138 may include payload control elements and may be configured based on one or more characteristics of those one or more payloads acceptable for use with and/or being used with a given drone 121 for a given mission and in view of one or more mission parameters 116, drone parameters 126, and/or fleet parameters 136.

Fleet payload parameters 138 may be configured based on one or more conditions such as the capabilities of a user interface device 112, or an owner interface device 122, an operator interface device 133, and/or any accessory devices to be used and communicatively coupled to any of such interface devices, for use with a given drone, during a given mission. It is to be appreciated that non-limiting examples of such accessory devices include controllers, heads-up displays, communications capabilities by and between a drone and the given user, owner, operator associated therewith for a given mission, and otherwise. For example, a drone outfitted for aerial photography may need to be communicatively coupled to a user interface device 112, owner interface device 122, and/or operator interface device 134 configured to facilitate control by a user, owner, and/or operator, as the case may be, of a camera's various features and functions, such as, its aperture, focal length, ISO setting, orientation (independent of the orientation of the drone itself), or otherwise. Fleet payload parameters 138 may preclude use of a drone 121 when a given user interface device 112, owner interface device 122, and/or operator interface device 133 is otherwise incompatible or not configured for use with a given payload, for a given mission.

The operator application 134 may also be configured, alone or in conjunction with other applications, to provide one or more fleet logs 139. The fleet log 139 may include the recording of any desired information related to uses of a drone for one or more missions. Non-limiting examples of such fleet log 139 information includes location, altitude, time on station, mission status (e.g., success or failure), total flight time, maintenance records, payloads, or otherwise for use of a drone. It is to be appreciated, that any and/or all information and/or applications utilized by an operator interface device 133, operator application 134, or otherwise to facilitate the use of a drone 121 for one or more missions, per one or more embodiments of the present disclosure, may be also provided to one or more of the govt systems 140, or otherwise in a fleet log 139. The fleet log 139 may include any and/or all information recorded in a flight log 119 and/or in a drone log 129 for one or more given drones. Such information may be provided in any format including, but not limited to, anonymized, encrypted, clear text, or otherwise.

As discussed above, it is to be appreciated that for at least one embodiment, a hierarchical relationship may exist between system, operators, owners and users, with the data gathered, available, and/or utilized, operations limitations presented, privileges granted, or otherwise will vary with the level of a given element (user, owner, operator, or system), with a system element having the greatest rights, privileges, and otherwise, and a user element having the least. In other embodiments, the rights, privileges, permissions, data, and otherwise (collectively "use rights") may be distributed across the system 100 such that use rights necessary for a given element, for a given mission, and/or for a given date/time, location or otherwise are available to such element. The system element 130 may be appropriately configured to execute one or more instructions to so dynamically, statistically or otherwise grant and revoke use rights.

Government System Element

As shown in FIG. 1, the system 100 may include one or more governmental or regulatory system elements 140, hereafter "govt systems". Such govt systems element 140 may be configured to regulate the use of drones 121 in view of governmental regulations, procedures, rules or other terms or conditions. Such govt systems element 140 may also be configured to respond to one or more needs for drones provided by a governmental body, such as drones used in the case of emergencies, fires, police operations, environmental monitoring and response, or otherwise.

For at least one embodiment, the system 100 may include a govt systems element 140 utilized to facilitate the governmental regulating and/or use of drones. The govt systems element 140 may include one or more govt systems at any level of jurisdiction, such as, local, country or region, state or territory, national, trans-national, or international. Govt systems elements 140 may also include public, non-government actors, such as refugee and relief services, and otherwise. As shown in FIG. 1, govt systems element 140 may include any service, feature or function 142 provided by governmental, or non-governmental actors including but not limited to drone control, air traffic control, drone restrictions, drone permitting, drone testing and certifications, emergency response, and otherwise. The govt systems element 140 may be communicatively coupled to the network 170 for use by and/or in coordination and/or conjunction with the fleet management systems 130, user elements 110, drone owner elements 120, data sources 150, resources 160 and otherwise.

Data Sources Element

As shown in FIG. 1, the system 100 may include use of one or more data sources elements 150. The data sources 150 may be owned, controlled, operated, or otherwise provided by any party. The data sources 150 may provide information and/or services which facilitate the use, individually and/or collectively, of drones 121 by users 110. Data sources 150 may provide information and/or services relevant to an intended use and/or actual use of a drone by a user with respect to a given flight area, flight path, or otherwise. Examples of such information and service include, but are not limited to, weather information, topographic information, ownership information (e.g., information as to the ownership of a given parcel of land over which a drone operation is to occur), utilities information (e.g., information identifying the location, height, and the like of utility lines), drone flight restrictions, such as those provided by the B4UFLY mobile application provided by the U.S. Governments Federal Aviation Administration (FAA), and any other information or services that may be relevant to an intended use and/or actual use of a drone 121 at any given time by a user 110 and in view of one or more drone rights 124.

Resources Element

The system 100 also may include use of one or more communications and/or positioning resource elements 160, such as global positioning satellite systems, telecommunications systems, and otherwise. Telecommunications systems may include the use of any presently available and/or future arising communications topologies, protocols, spectrum or otherwise, non-limiting examples of these include, 3G, 4G, and 5G cellular/wireless systems, WiFi systems, Wi-Max, Bluetooth, satellite based systems, RFID, near field communications, future arising communications technologies and systems and devices for use therewith, and the like.

Network Element

As shown in FIG. 1, the disparate elements of the system 100 may be communicatively coupled using one or more communications network elements 170. For at least one embodiment, the various system elements are communicatively coupled, as needed, by a public network, such as the Internet. It is to be appreciated that other private, secure, non-secured, or other communications topologies may be used such as those provided via the use of secure socket layers, virtual private networks, dedicated networks, or otherwise to facilitate the communicative coupling of the various elements of the system. Such communications network elements 170 may include, for example, one or more web servers, routers or other commonly known and/or later arising communications components, technologies, protocols, frequency plans, or the like may be used to communicatively couple the various system elements.

Figure 2:
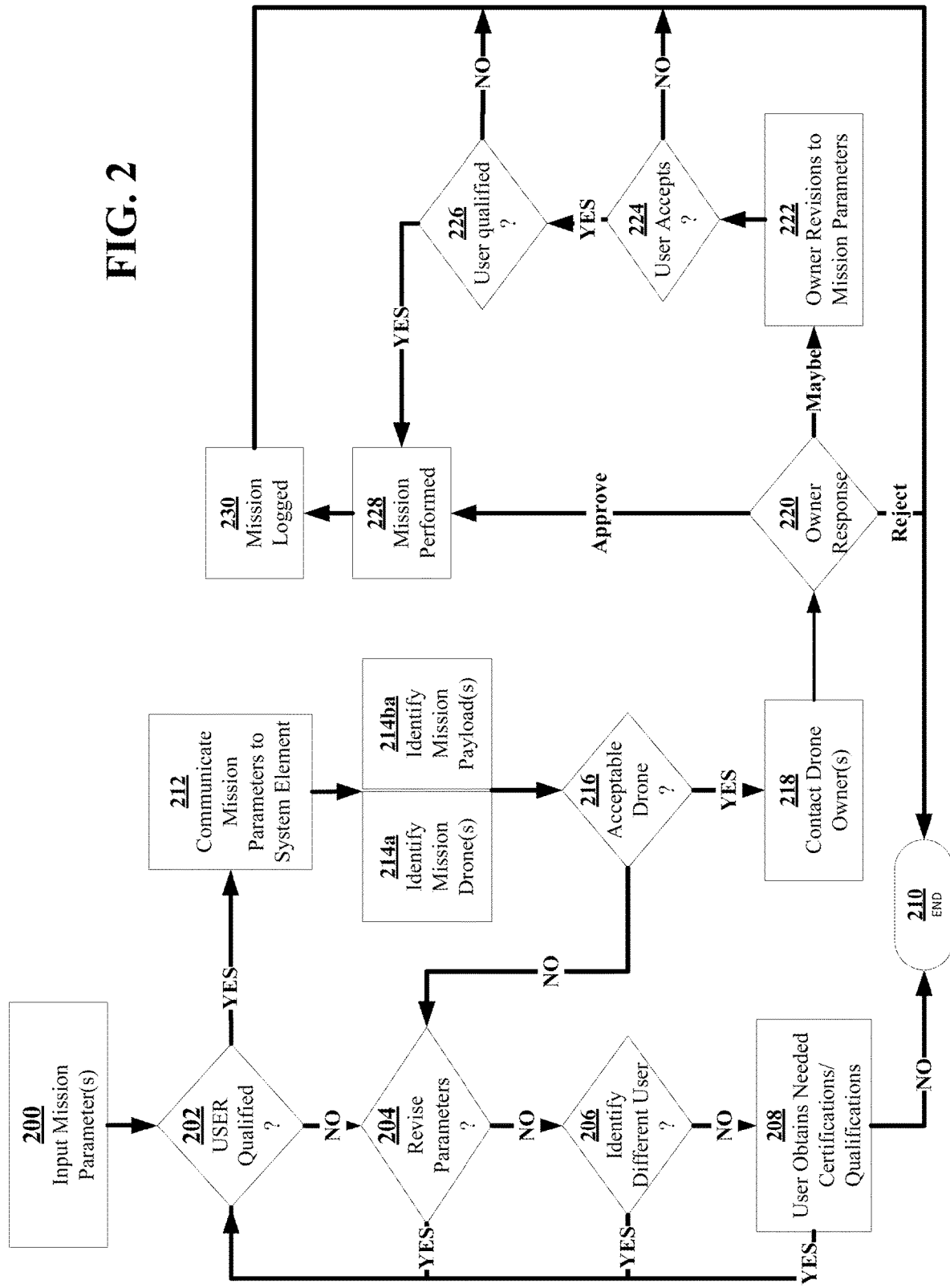
FIG. 2 is a flow chart depicting a process for use of the system and in accordance with at least one embodiment of the present disclosure.

As shown in FIG. 2, one embodiment of a process for using the system 100 includes the interactivity of a user element registered a fleet management system element. For purposes of this discussion of the process of FIG. 2, it is assumed that a user associated with a given user element has previously registered with the fleet management system with any demographic information, financial information, insurance information, certifications or otherwise relevant to a given use of a given drone, for a given mission, which includes the use of a given payload. It is to be appreciated that an infinite variety of uses, drones, missions, and payloads may arise and that the user characteristics, as specified in one or more user records may accordingly vary. Likewise, for purposes of this discussion of the process of FIG. 2, it is assumed that an owner associated with a given drone owner element, and the drones and payloads associated therewith, has also previously registered the fleet management system.

As shown in FIG. 2, the use of a drone by a registered user element may include the operation of a user specifying, using user application 113, one or more mission parameters, as per Operation 200.

Per Operation 202, a verification may occur that the user is authorized, qualified and/or certified to execute the mission. For at least one embodiment, user verification may occur using a given user interface device 112 using one or more user records 114 accessible by the user interface device 112. For at least one embodiment, user verification may occur locally using a user application 113 executable by the given user interface device. For at least one embodiment, user verification may occur using a system element 130 communicatively coupled to the user interface device 112. For at least one embodiment, user verification occurs using one or more data records provided by at least one of the user element 110, a fleet management system element 130, a govt system element 140 and/or a data sources element 150.

Per Operation 204, if the user is not verified for a given set of mission parameters, an option may be presented to the user whereby one or more mission parameters may be revised. For example, a user desiring to operate a drone above a certain ceiling may result in a finding, per Operation 202, of the user not being qualified to so fly the drone. The user application 113, alone and/or in combination with the system element 130, may be configured to propose a revised maximum ceiling for the given mission for which the user is qualified. For example, a drone operator may be limited to a maximum ceiling of less than 400 feet above ground, thereby precluding the use of a drone to photograph roofs of 40 story or higher buildings—each story using 10 feet of elevation. A revised mission to capture photographs of smaller buildings may be permissible and per Operation 204 revised parameters may be presented to the user for acceptance or rejection.

If the revised parameters are accepted by the user, the process returns to Operation 202 for further verification. It is to be appreciated that an iterative process may be used throughout the process flow of FIG. 2 and otherwise until acceptable mission parameters, if any, are identified.

If the revised parameters are not accepted by the user, the process may continue with optional operation 206, whereby an alternative user, if any, may be identified—such alternative user having the qualifications necessary to operate the drone according to the then requested mission parameters. If the different user is acceptable, the process continues with Operation 202. If the different user, if any, is not acceptable, the process may continue with Operation 208 whereby those certifications and/or qualifications with a given user may need to acquire, if so acquirable, may be obtained. It is to be appreciated that the process of obtaining such qualifications and/or certifications may occur any number of days, weeks, years or otherwise, if ever. The process then continues with the user obtaining the needed certifications and Operation 202, or the process ends 210.

Referring again to Operation 202, if the user is verified, the process continues with operation 212 whereby the mission parameters are communicated to the system element 130.

Per Operations 214a and 214b, the system element 130 reviews its fleet records, which may include operator and drone records, to identify one or more drones acceptable for the mission. In identifying such one or more drones, the system element 130 may also review fleet payload parameters 138 and payload parameters 128 associated with one or more such acceptable drones to identify drones both having acceptable operational capabilities and acceptable payload capabilities for the given mission. It is to be appreciated that Operations 214a/214b may occur in any order or sequence and often in an iterative fashion to identify a set of, if any, one or more drones acceptable from both an operational and a payload perspective for the given mission.

Per Operation 216, a determination is made as to whether an acceptable drone and payload combination are available for the mission. If no, then the process continues with Operation 204 and the option for the user to revise the mission parameters. If yes, the process continues with Operation 218.

Per Operation 218, at least one owner of a drone having the desired operational and payload capabilities for the given mission is notified of the opportunity to rent, release or otherwise provide (hereafter, collectively "release") their drone for use for the mission. It is to be appreciated that such notification may occur between the system element 130 and the drone owner using the owner application 123 hosted on the owner interface device 122. Such notification may occur using any desired technology including, but not limited to, instant messaging, application notification, email, voice, or otherwise. It is to be appreciated that the notification may be presented to one or more owners having a drone which satisfies the mission parameters. It is to be appreciated that the system element 130 may determine which drone owners have such a drone using at least one of owner records 124, drone parameters 126, payload parameters 128, drone logs 129, fleet records 135, fleet parameters 136, fleet payload parameters 138, fleet logs 139 and other information, such as information provided by govt systems elements 140, data sources elements 150, or otherwise.

Per Operation 220, the one or more drone owners may respond by approving, tentatively, or rejecting release of one or more drones for the mission. If all of the one or more drone owners respond negatively and reject the mission, the process ends, per Operation 210. If none of the one or more drone owners respond affirmatively, but, one or more of such drone owners respond tentatively, the process continues with Operation 222. It is to be appreciated that the response by an owner may occur automatically, semi-automatically, or manually.

Per Operation 220, the owner(s) may propose revisions to one or more of the mission parameters. Such revisions may be proposed automatically, semi-automatically, or manually. For example, an owner may desire for their drone to not be flown in regions or flown at lower maximum ceilings when the altitude of the ground exceeds a certain elevation, as may occur in mountainous areas. The owner may thus propose revisions to one or more mission parameters.

Per Operation 224, the owner(s)' revisions may be presented to the user for approval. If not approved, the process ends, with respect to at least that potential pairing of drone and mission and user. It is to be appreciated that other potential pairings of drone and mission and user may still arise and one or more of such pairings may be acceptable to the user and the owner. Further, it is to be appreciated that a dialog may occur between the owner and the user, whereby mission parameters acceptable to all may be discussed and, if possible, agreed upon.

Per Operation 226, once any revised mission parameters are acceptable to the owner and the user, the process may continue with a verification that the user is still qualified to operate the drone in accordance with such revised mission parameters. It is to be appreciated, that such approval process may occur iteratively, as occurs per operations 202-208, and/or optionally. If the user is not qualified and acceptable and qualifiable mission parameters cannot be found and/or acceptable to each of the user, the owner, the system operators, the government, and/or any other entity or body whose approval may be needed for a given mission, the process ends, as per Operation 210. Further, if it is determined that the user is qualified for the revised mission parameters, the process continues with Operation 228.

Per Operation 228, when acceptable mission parameters are approved by at least one owner, the process continues with performing the mission using the released drone(s). The mission is desirably performed without interruption and in accordance with the mission parameters approved by the relevant parties. Mission performance may include operations including, but not limited to, establishing communications links between a drone and at least one of the user, owner, system operator or otherwise, dispatching a drone to the mission area, controlling the drone in furtherance of the mission by one of the user, owner, system operator, or otherwise, controlling the payload in furtherance of the mission, and other operations. However, it is to be appreciated that conditions anticipated to arise during a mission may not actually occur during a mission. Accordingly, the process may include the operations of monitoring the mission by one or more of the user, owner, system element, govt system element, or otherwise and revising, aborting, suspending, delaying or taking other action with respect to the mission. For example, a mission might be aborted when a data source 150 reports high winds in a flight path or flight area intended for a given mission.

Per Operation 230, the mission as performed, aborted or otherwise is logged. Such logging may be provided for purposes of accounting, regulatory, or otherwise. It is to be appreciated that the use of a drone in accordance with a mission may incur fees and/or costs bore by one or more parties, such as a user seeking to use another's drone having to pay a license or use fee, a drone owner having to pay airspace or other fees, and a system element having to pay approval, certification or other fees. Such fees may be borne by any party, as desired for any given embodiment of the present disclosure.

Drone Mission Examples

It is to be appreciated that the various embodiments of the present disclosure may be utilized in an infinite number of missions. The following provides a non-exhaustive and non-limiting identification of a few of such missions, such missions may be combined in any given iteration, if desired.

Mission 1: One or more drone owners maintain one or more fleets of drones situated at multiple base stations, such as at park ranger stations, town hubs, emergency responder stations, trailheads, town hubs or otherwise. Drones from such fleets may be used to provide interactive tour guides, provide provisions or supplies to users, respond to emergencies, provide connectivity to users in remote areas, or otherwise.

Mission 2: System provides for drones that can be scheduled to arrive at a location, at a certain day and/or time, and to provide desired features or functions, such as, photographing weddings, engagements, birthdays, or other celebrations or events. Such drones may be requested in advance, on-demand, or otherwise.

Mission 3: A drone can be scheduled, in advance, real-time or otherwise, to provide services and/or features in support of a given job. The user may request the nearest drone to provide such services/features and may assume control of such drone at a relevant time, such as at the start of the mission, upon arrival of the drone on a duty station, or otherwise. To comply with regulatory and other guidelines, the system may be configured to permit user control of the drone(s) only in accordance with such guidelines. Control within such parameters may be recognized as providing the system element, drone owner and/or user with shields against liabilities that may otherwise arise, and in view of common carrier liability principles. Such guidelines may include the use of one or more digital bubbles which preclude and prohibit use of a drone, by a user, owner or otherwise outside of established parameters, regulations and/or otherwise.

Mission 4: Consideration for drone use may involve any desired form, including but not limited to financial consideration. Drone use may be accounted for using any desired metric, such as reservation time, distance traveled, drone size, drone capabilities, payload capabilities, payloads utilized, or otherwise.

Mission 5: Use of drone may occur using any network topology, including, but not limited to, satellite, cellular, IoT, 5G, WiFi, or otherwise. Accounting for use of drone may arise in view of network topologies utilized.

Mission 6: Drone fleet may be outsourced, crowd sourced or otherwise provided. Owners may include private persons providing use of privately owned drones by others. Any form of consideration may be provided, if any, including monetary, credits for use of other's drones, or otherwise.

Mission 7: Drone monitoring may occur at any point of the system including by the user element, owner element, system element, govt systems element, or otherwise. Processes may be utilized to identify lost or late returning or responding drones. Tracking of drones may occur real-time, time-delayed, not at all, or otherwise using any system component or combination of components.

Mission 8: Drones may be insured collectively, individually, by system element entity, by user liability policies, by owner liability policies, combinations of the foregoing, or otherwise.

Mission 9: Drones used for selfies in any environment. Drones may be used for provisioning of supplies and/or retrievals of essentials, such as medicines, passports, or otherwise. Drones may be used for emergency response. Drones may be used for conducting interactive and/or non-interactive tours. Drones used in the air, on ground, and/or under water. Drones can be configured with a generic or standardized mount configured and/or configurable to support two or more types of payloads, such as, but not limited to, cameras, microphones, speakers, baskets, tools, or otherwise.

Mission 10: Use of drone in natural settings. For example, a user and/or group thereof desire to hike to Alberta Falls in Rocky Mountain National Park. Being their first such trip, upon arriving at the trailhead, they realize that they are unfamiliar with the region and would like help navigating the trail. A user inputs a service order on their user application that specifies certain mission parameters, such as, the need for one or more drones to function as a guide and as a photographer during one or more elements of the trip. During the trip, the group follows one or more drones dispatched by the system element. Such drones providing both navigation and information regarding the trail, surrounding landscape, and otherwise. Upon reaching the waterfall and per the previously input mission parameters or the then input mission parameters, one or more drones are used to capture overhead and/or other images, still, motion, slow-motion, or otherwise of one or more members of the group. Such images may be captured automatically, semi-automatically, or upon direction and remote input, using a user application 113. One or more drones may be used to guide the group back to the trailhead, provide status updates to distant contacts, or otherwise. Such drones may be proximate too or distant from the group, as needed for a given function of a mission at a given time and/or location. The drone(s) may return to their one or more base stations upon completion of other portion, if not all, of the mission parameters. Such drones may upload user collected data to cloud or other data storage and/or processing services for use by the group member, drone owner, system operators, governmental entities, or otherwise.

Accordingly, it is to be appreciated that the various embodiments of the present disclosure provide systems, devices, computer readable mediums, processes and methods for facilitating the use of drones and using drones by non-owners thereof. The various embodiments may be used without countless numbers of missions and in accordance with fixed, variable, and/or changing mission parameters.

Although various embodiments of the claimed invention have been described above with a certain degree of particularity, or with reference to one or more individual embodiments, those skilled in the art could make numerous alterations to the disclosed embodiments without departing from the spirit or scope of the claimed invention. The use of the terms "approximately" or "substantially" means that a value of an element has a parameter that is expected to be close to a stated value or position. However, as is well known in the art, there may be minor variations that prevent the values from being exactly as stated. Accordingly, anticipated variances, such as 10% differences, are reasonable variances that a person having ordinary skill in the art would expect and know are acceptable relative to a stated or ideal goal for one or more embodiments of the present disclosure. It is also to be appreciated that the terms "top" and "bottom", "left" and "right", "up" or "down", "first", "second", "next", "last", "before", "after", and other similar terms are used for description and ease of reference purposes only and are not intended to be limiting to any orientation or configuration of any elements or sequences of operations for the various embodiments of the present disclosure. Further, the terms "coupled", "connected" or otherwise are not intended to limit such interactions and communication of signals between two or more devices, systems, components or otherwise to direct interactions; indirect couplings and connections may also occur. Further, the terms "and" and "or" are not intended to be used in a limiting or expansive nature and cover any possible range of combinations of elements and operations of an embodiment of the present disclosure. Other embodiments are therefore contemplated. It is intended that all matter contained in the above description and shown in the accompanying drawings shall be interpreted as illustrative only of embodiments and not limiting. Changes in detail or structure may be made without departing from the basic elements of the invention as defined in the following claims.

Further, a reference to a computer executable instruction includes the use of computer executable instructions that are configured to perform a predefined set of basic operations in response to receiving a corresponding basic instruction selected from a predefined native instruction set of codes. It is to be appreciated that such basic operations and basic instructions may be stored in a data storage device permanently and/or may be updateable, but are non-transient as of a given time of use thereof. The storage device may be any device configured to store the instructions and is communicatively coupled to a processor configured to execute such instructions. The storage device and/or processors utilized operate independently, dependently, in a non-distributed or distributed processing manner, in serial, parallel or otherwise and may be located remotely or locally with respect to a given device or collection of devices configured to use such instructions to perform one or more operations.

What is claimed is:

1. A method, for controlling drones, comprising:
   first instructing a user device to execute non-transient first computer instructions for user operations, stored by the user device, the user operations including at least one of:
      a first user operation facilitating access to user data;
      a second user operation facilitating access to at least one drone parameter for a user selected drone; and
         wherein the user selected drone has been selected for a drone mission including at least two drones in a fleet of drones;
      a third user operation facilitating user operative control of at least one flight control for the user selected drone;
   second instructing an owner device to execute non-transient second computer instructions for owner operations, stored by the owner device, the owner operations including at least one of:
      a first owner operation facilitating access to owner data;
      a second owner operation facilitating access to at least one drone parameter for one or more owner selected drones; and
         wherein the owner selected drones have been selected from the at least two drones in the fleet of drones;
      a third owner operation facilitating owner operative control of at least one flight control for the one or more owner selected drones.

2. The method of claim 1,
   wherein the user operations further include:
      a fourth user operation facilitating user operative control of at least one payload control for the user selected drone.

3. The method of claim 1,
   wherein the one or more owner selected drones includes the user selected drone.

4. The method of claim 1,
   wherein the owner operations further include:
      a fourth owner operation facilitating owner operative control of a payload for the one or more drones owner selected drones.

5. The method of claim 4,
wherein the one or more owner selected drones includes the user selected drone.

6. The method of claim 5, further comprising:
prioritizing, when preempted by the owner, owner operative control over user operative control of the user selected drone; and
wherein, during the drone mission, the user device controls operation of the user selected drone unless preempted by the owner device.

7. The method of claim 6, further comprising:
third instructing a fleet control system to execute non-transient third computer instructions for fleet control operations, stored by the fleet control system, the fleet control operations including at least one of:
a first fleet control operation facilitating access to a fleet record; and
a second fleet control operation facilitating access to at least one fleet parameter for the fleet of drones.

8. The method of claim 7,
wherein the fleet control operations further include:
a third fleet control operation facilitating fleet control of the at least two drones in the fleet of drones by one or more of the first owner operation, the second owner operation, the third owner operation, and the fourth owner operation.

9. The method of claim 8, further comprising:
prioritizing, when preempted by the fleet control system, fleet control system operative control over owner device operative control and user device operative control; and
wherein, during the drone mission, the user device controls operations for the user selected drone unless preempted by one of the owner device or the fleet control system; and
wherein, the owner device controls operations for the one or more owner selected drones unless preempted by the fleet control system.

10. The method of claim 9,
wherein the fleet control operations further include:
a fourth fleet control operation facilitating fleet payload control for payloads of the at least two drones in the fleet of drones.

11. The method of claim 10, further comprising:
fourth instructing a government element to execute non-transient third computer instructions for government drone control operations, stored by the government element, the government drone control operations including at least one of:
a first government drone control operation of verifying a user of the user device can utilize the user selected drone for the drone mission;
a second government drone control operation of specifying the at least one drone parameter for the user selected drone; and
a third government drone control operation specifying a flight path for the user selected drone.

12. A computer readable medium non-transiently storing first computer executable instructions which configure a user device to perform user drone control operations comprising:
a first user drone control operation facilitating access to user data;
a second user drone control operation facilitating access to at least one drone parameter for a user selected drone; and
wherein the user selected drone has been selected for a drone mission including at least two drones in a fleet of drones;
a third user drone control operation facilitating user operative control of at least one flight control for the user selected drone.

13. The computer readable medium of claim 12,
wherein the user drone control operations further include:
a fourth user drone control operation facilitating user operative control of at least one payload control for the user selected drone.

14. The computer readable medium of claim 12,
wherein the computer readable medium further non-transiently stores second computer instructions which configure an owner device to perform owner drone operations comprising:
a first owner drone operation facilitating access to owner data;
a second owner drone operation facilitating access to at least one drone parameter for one or more owner selected drones; and
wherein the owner selected drones are selected from the at least two drones in the fleet of drones;
a third owner drone operation facilitating owner operative control of at least one flight control for the one or more owner selected drones.

15. The computer readable medium of claim 14,
wherein the user drone control operations and the owner drone operations prioritize, when preempted by the owner, owner operative control over user operative control of the user selected drone; and
wherein, during the drone mission, the user device controls operation of the user selected drone unless preempted by the owner device.

16. A computer readable medium non-transiently storing computer executable instructions which configure a fleet control system to perform drone fleet control operations comprising:
a first drone fleet control operation facilitating access to a fleet record; and
a second drone fleet control operation facilitating access to at least one fleet parameter for a fleet of drones; and
a third drone fleet control operation facilitating fleet control of at least one drone in the fleet of drones by one or more of drone owner operations.

17. The computer readable medium of claim 16,
wherein the one or more drone owner operations include:
a first owner drone operation facilitating access to owner data;
a second owner drone operation facilitating access to at least one drone parameter for one or more owner selected drones; and
wherein the owner selected drones are selected from the fleet of drones;
a third owner drone operation facilitating owner operative control of at least one flight control for the one or more owner selected drones.

18. The computer readable medium of claim 17,
wherein the one or more drone owner operations further include:
a fourth owner drone operation facilitating operative control of at least one payload control for the one or more owner selected drones.

19. The computer readable medium of claim 17,
wherein the one or more drone owner operations further include:
  determining whether a user element is not permitted to execute a proposed mission; and
  when not permitted:
    proposing one or more revised mission parameters to the user element; and
    when the one or more revised mission parameters are accepted by the user element, approving the one or more revised mission parameters for a new mission, and communicating an approval of the new mission to an owner element.

\* \* \* \* \*